(12) United States Patent
Takai et al.

(10) Patent No.: US 6,777,505 B2
(45) Date of Patent: Aug. 17, 2004

(54) METHOD FOR MANUFACTURING ETHYLENE-VINYL ACETATE COPOLYMER AND APPARATUS FOR MANUFACTURING THE SAME

(75) Inventors: Masato Takai, Kurashiki (JP); Etsuo Nakazato, Kurashiki (JP); Kouichi Takahashi, Okayama (JP); Yoichi Matsumoto, Kurashiki (JP); Masahiro Igaki, Okayama (JP); Takaharu Kawahara, Okayama (JP); Nobutoshi Wada, Nakajo-machi (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/097,751

(22) Filed: Mar. 15, 2002

(65) Prior Publication Data

US 2002/0176812 A1 Nov. 28, 2002

(30) Foreign Application Priority Data

Mar. 16, 2001 (JP) ........................................ 2001-075697

(51) Int. Cl.$^7$ .................................................. C08F 2/04
(52) U.S. Cl. ......................... 526/64; 526/212; 526/331
(58) Field of Search ........................... 526/64, 212, 331

(56) References Cited

U.S. PATENT DOCUMENTS 3,891,603 A   6/1975  Heil et al.
4,649,186 A   3/1987  Jenkins et al.
4,657,994 A   4/1987  Tanaka et al.

FOREIGN PATENT DOCUMENTS

| EP | 0 136 559 | * | 4/1985 |
|----|-----------|---|--------|
| JP | 60-53513  |   | 3/1985 |
| JP | 62-7708   |   | 1/1987 |
| JP | 11-116637 |   | 4/1999 |
| JP | 2000-178306 |  | 6/2000 |

OTHER PUBLICATIONS

I. Shobo, The Society of Chemical Engineers, pps. 166–174, "Fundamental Chemical Engineering", Feb. 10, 1995, (with partial English translation).

* cited by examiner

Primary Examiner—William Cheung
(74) Attorney, Agent, or Firm—Oblon, Spivak, McClelland, Maier & Neustadt, P.C.

(57) ABSTRACT

The present invention provides a method for manufacturing an ethylene-vinyl acetate that includes:
(a) introducing an ethylene containing gas and a vinyl acetate containing liquid into a heat exchanger, said gas including ethylene vaporized from a polymerization solution;
(b) bringing said gas into contact with said liquid in the heat exchanger so as to dissolve at least a portion of the ethylene in said gas into said liquid; and
(c) introducing said liquid from the heat exchanger into the polymerization solution.

In this method, the ethylene containing gas and the vinyl acetate containing liquid flow in parallel with each other in the heat exchanger.

9 Claims, 2 Drawing Sheets

METHOD FOR MANUFACTURING ETHYLENE-VINYL ACETATE COPOLYMER AND APPARATUS FOR MANUFACTURING THE SAME

FIELD OF THE INVENTION

The present invention relates to a method for manufacturing an ethylene-vinyl acetate copolymer (EVA) and an apparatus for the same.

DESCRIPTION OF THE PRIOR ART

Saponified ethylene-vinyl acetate copolymers (ethylenvinyl alcohol copolymer: EVOH) have excellent melt moldability, gas barrier properties, water resistance, oil resistance, antistatic properties and mechanical strength, and are used as various types of packages in the form of films, sheets and containers etc. Increasing demand for EVOH has emphasized the importance of the technology for manufacturing EVOH and its precursor (EVA), especially for the continuous manufacture of EVA.

JP 60(1985)-53513 A discloses a method for the continuous manufacture of EVA over a long period. To suppress overheating of the polymerization vessel and adhesion of scale to the vessel, the method includes contacting an ethylene containing gas with vinyl acetate or a vinyl acetate solution in a heat exchanger in countercurrent to each other. In this method, as the amount of raw materials increases to boost the EVA output, the gas flow in the heat exchanger inhibits the smooth passage of the vinyl acetate (solution). Due to this phenomenon, which is called a flooding phenomenon, the output of EVA is limited by the capacity of the heat exchanger.

DISCLOSURE OF THE INVENTION

Viewed from one aspect, the present invention thus provides a method for the manufacture of an ethylene-vinyl acetate copolymer (EVA) in which ethylene and vinyl acetate are copolymerized in a polymerization solution which comprises ethylene, vinyl acetate, a polymerization solvent and a polymerization initiator. This method comprises:

(a) introducing an ethylene containing gas and a vinyl acetate containing liquid into a heat exchanger, said gas comprising ethylene vaporized from the polymerization solution;

(b) bringing said gas into contact with said liquid in the heat exchanger so as to dissolve at least a portion of the ethylene in said gas into said liquid; and (c) introducing said liquid from the heat exchanger into the polymerization solution.

In this method, the ethylene containing gas and the vinyl acetate containing liquid flow in parallel with each other in the heat exchanger.

The vinyl acetate containing liquid may be vinyl acetate or a vinyl acetate containing solution. The solution can include the polymerization solvent and preferably is a solution of vinyl acetate in the polymerization solvent.

It is preferable that the heat exchanger has a plurality of tubes and that the vinyl acetate containing liquid flows along the inner surfaces of the tubes and a refrigerant flows along the outer surfaces of the tubes. It is preferable that a refrigerant and the vinyl acetate containing liquid flow in parallel with each other in the heat exchanger.

Temperature $T_1$ (° C.) being the temperature of the vinyl acetate containing liquid that is introduced from the heat exchanger into the polymerization solution, and temperature $T_2$ (° C.) being the temperature of the polymerization solution, should preferably satisfy the relationship $-20 \leq T_1 < T_2$.

The EVA preferably contains 5 mol % to 60 mol % of ethylene. An aliphatic alcohol having not more than four carbon atoms is suitable for the polymerization solvent.

Viewed from another aspect, the present invention provides a method for the continuous manufacture of EVA containing 5 mol % to 60 mol % of ethylene. This method comprises:

(a') continuously introducing ethylene, a vinyl acetate containing liquid, a polymerization solvent and a polymerization initiator into a polymerization vessel, whereby to form a polymerization solution, wherein at least a portion of said liquid is introduced via a heat exchanger, wherein the vinyl acetate containing liquid is vinyl acetate or a vinyl acetate solution;

(b') continuously introducing an ethylene containing gas comprising ethylene vaporized from the polymerization solution into the heat exchanger;

(c') continuously bringing said gas into contact with said liquid in the heat exchanger so as to dissolve at least a portion of the ethylene in said gas into said liquid, wherein said gas and said liquid flow in parallel with each other;

(d') continuously introducing said liquid from the heat exchanger into the polymerization solution;

(e') continuously vaporizing a portion of the ethylene in the polymerization solution so as to absorb at least a portion of the heat of polymerization in the polymerization solution, wherein said gas in step (b') includes at least a portion of the ethylene vaporized in step (e'); and (f') continuously draining a portion of the polymerization solution from the vessel.

Viewed from a further aspect, the present invention provides a method for manufacturing an ethylene-vinyl alcohol copolymer (EVOH) that includes saponifying the EVA obtained by the method herein described. The present invention also provides EVA obtainable by the above method.

The present invention provides an apparatus for manufacturing EVA. The apparatus includes:

a vessel for containing a polymerization solution that includes ethylene, vinyl acetate, a polymerization solvent and a polymerization initiator;

a heat exchanger;

a first pipe for introducing a vinyl acetate containing liquid into the heat exchanger, said first pipe having one end that is connected to the heat exchanger;

a second pipe for introducing an ethylene containing gas from the vessel into the heat exchanger, said second pipe having one end that is connected to the heat exchanger; and a third pipe for introducing said liquid from the heat exchanger into the vessel.

In this apparatus, said one end of the first pipe and said one end of the second pipe are connected to a portion of the heat exchanger such that in use said gas and said liquid flow in parallel with each other in said heat exchanger.

Said portion of the heat exchanger is preferably connected to an upper portion of the heat exchanger and the third pipe should have one end that is connected to a lower portion of the heat exchanger (i.e. a portion lower than the portion to which the first and the second pipes are connected).

It is preferable that the heat exchanger is a wetted-wall multi-tubular heat exchanger. The apparatus can further include a fourth pipe for draining the polymerization solution including EVA from the vessel.

DESCRIPTION OF THE PREFERRED EMBODIMENT

Figure 1:
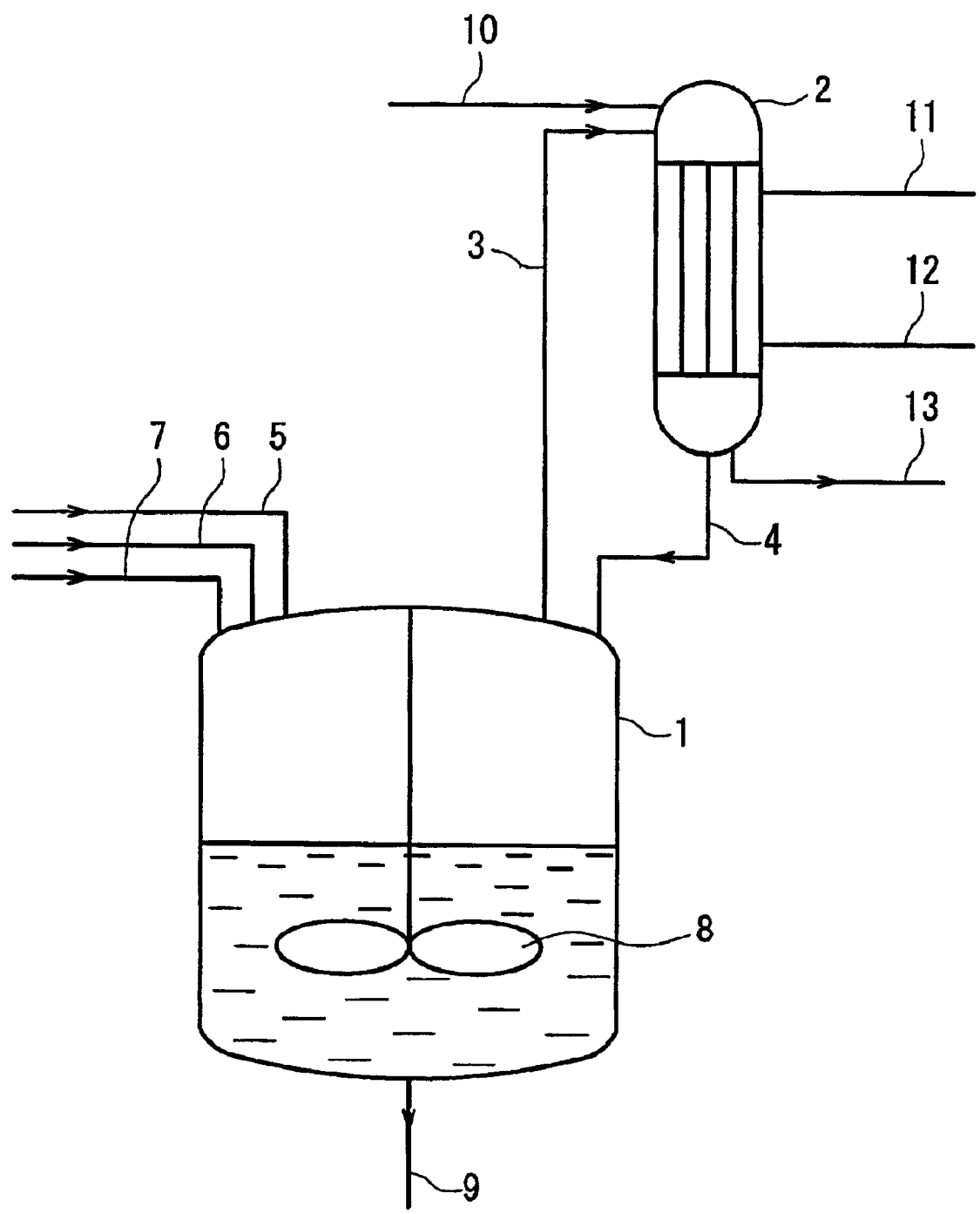
FIG. 1 shows one embodiment of an apparatus in accordance with the present invention.

The following description will depict a preferred embodiment of the present invention.

When composed to the method disclosed in JP 60(1985)-53513, the method in accordance with the invention that includes steps (a) to (c) or (a') to (f) can provide some advantages as follows.

i) Heat conductivity does not considerably deteriorate because less polymer scale adheres to the vessel. Thus, the method enables a continuous operation for a long period.

ii) Since a coil for cooling is not required in the vessel, dead space in the vessel can be eliminated and formation of a gel or the like can be reduced.

iii) A large-scale vessel can be used.

iv) Since a driving device for circulation is dispensed with the apparatus is relatively simple.

v) Since the heat of dissolution of ethylene as well as the heat of condensation of ethylene is employed to absorb the heat of polymerization, a large amount of circulating ethylene is not required.

vi) In an ethylene-vinyl acetate mixture, conditions for ethylene condensation are not limited to a narrow range and relatively high temperature of the cooling medium (refrigerant) is permissible.

The ethylene from the vessel comes into contact with and flows in parallel with the vinyl acetate containing liquid in the heat exchanger. Thus, the heat exchanger also serves as an absorbing device for ethylene, or a device for enhancing ethylene absorption.

In the chemical engineering field, consideration has been given to various methods of gas absorption and gas absorption devices. "Shoho Kagaku Kogaku (Elementary Chemical Engineering)" (The Society of Chemical Engineering, Japan; published by IZUMI shobo; 1964) discloses on page 166 that the overall coefficient of masstransfer, the gas-liquid interfacial area and a driving force are significant to function of absorption devices and that a countercurrent system is superior to a parallel current system in increasing the driving force. The countercurrent system adapts to a wetted-wall multi-tubular heat exchanger as shown on page 168 of this book. It has thus been common practice in this technical field for many years that gas and liquid should be brought into contact with each other in a countercurrent flow.

JP 60(1985)-53513 follows this common practice that gives priority to the efficiency of gas absorption. However, as mentioned previously, this causes a flooding phenomenon when the output of EVA is increased.

A parallel current system may cause a problem in conventional absorption devices because gas may not dissolve into the solution to a sufficient degree (close to 100%). However, surprisingly, the inventors have found that a parallel current flow is superior to a countercurrent flow when dissolving vaporized ethylene into a vinyl acetate containing liquid in the manufacture of EVA. Even if gaseous ethylene remains in the heat exchanger and is introduced into the vessel, the gaseous ethylene causes no problem in the vessel. Further a parallel flow also can provide sufficient contact between the gas and the liquid absorber that the absorbing efficiency does not decrease. Since a parallel current system eliminates the cause of flooding, there is no need to adjust reaction conditions, such as the amount of ethylene supplied or the reaction temperature. Thus, a parallel current system is advantageous in terms of increased productivity.

In the present invention, the heat of dissolution in dissolving ethylene as well as the heat of condensation is employed to reduce the heat of polymerization. Therefore, the solution in the vessel preferably has not less than a predetermined concentration of ethylene, or the EVA from the solution preferably contains not less than 5 mol %, more preferably not less than 10 mol %, further preferably not less than 20 mol % of ethylene. If EVA that contains less than 5 mol % of ethylene should be continuously manufactured, decreasing the supply of vinyl acetate or increasing the supply of the polymerization solvent is necessary to sufficiently reduce the heat of polymerization. This decreases productivity and raises the manufacturing cost.

To obtain EVA that has a relatively high ethylene content, the polymerization solution in the vessel should have a high concentration of ethylene. This requires a high partial pressure of ethylene. An excessively high internal pressure increases the load on the vessel. Thus, the EVA formed from the polymerization solution should preferably contain not more than 60 mol %, more preferably not more than 55 mol %, further preferably not more than 50 mol % of ethylene for safety.

A wetted-wall multi-tubular heat exchange is suitable for the effective reduction of heat. In this exchanger, liquid absorber can pass through the heat exchanger in the form of thin films, providing a large contact area with the gas, leading to effective absorption. It is preferable for a refrigerant to flow along the outer surfaces of the tubes in the same direction as the flow of the ethylene containing gas and the vinyl acetate containing liquid (i.e. in parallel to the liquid). This parallel flow raises the dissolving velocity of ethylene. This is because the gas and the liquid are efficiently cooled by a low temperature refrigerant.

Temperature $T_2$ of the polymerization solution in the vessel is preferably in a range of 30° C. to 150° C., although $T_2$ is not limited to this range. If $T_2$ is more than 150° C., the rate of side reactions may increase and thus increase the impurities in the EVA. If $T_2$ is less than 30° C., the rate of polymerization $T_2$ may considerably decreases. $T_2$ is preferably not less than 35° C., more preferably not less than 40° C., particularly preferably not less than 45° C. With respect to the upper limit of the temperature, $T_2$ is preferably not more than 120° C., more preferably not more than 100° C., particularly preferably not more than 95° C.

Temperature $T_1$ of the vinyl acetate containing liquid that is introduced from the heat exchanger into the vessel is preferably in a range in which ethylene can coexist in the gas phase and the liquid phase. Where the polymerization pressure (i.e. the pressure of the gas phase in the vessel) is 20 to 70 kg/cm², the temperature $T_1$ is preferably not less than −20° C., more preferably not less than −10° C., and is preferably not more than 50° C., more preferably not more than 40° C.

It is preferable that the temperatures $T_1$ (° C.) and $T_2$ (° C.) satisfy the relationship $-20 \leq T_1 < T_2$. If $T_1$ is higher than $T_2$, a reduction of the heat in the vessel cannot be expected. The temperatures $T_1$ and $T_2$ can be controlled by adjusting the supply rate or the temperature of the ethylene, vinyl acetate or polymerization solvent, the polymerization pressure, or the like.

In view of handling and manufacturing costs, an aliphatic alcohol having not more than four carbon atoms is most suitable for the polymerization solvent. Examples of aliphatic alcohols include methanol, ethanol, n-propanol, i-propanol, n-butanol and t-butanol. Aliphatic alcohols having not more than three carbon atoms are more preferable, and one carbon alcohol, methanol, is most preferable.

As the polymerization initiator, at least one compound selected from a diacylperoxide-based initiator, a valeronitrile-based initiator, and a peroxydicarbonate-based initiator is preferably used, although the initiator is not limited to these. Examples of diacylperoxide-based polymerization initiators include acetyl peroxide, dipropyl peroxide, isobutyryl peroxide, benzoyl peroxide, dilauroyl peroxide. Examples of valeronitrile-based polymerization initiators include 2,2'-azobis(2,4,4'-trimethyl valeronitrile), 2,2'-azobis(2,4-dimethyl valeronitrile), 2,2'-azobis(4-methoxy-2,4-dimethyl valeronitrile), 2,2'-azobis(4-ethoxy-2,4-diethyl valeronitrile), 2,2'-azobis(4,4'-diethoxy-2-methyl valeronitrile). Examples of peroxydicarbonate-based polymerization initiators include dicyclohexyl peroxydicarbonate, bis(4-t-butylcyclohexyl) peroxydicarbonate, di-n-propyl peroxydicarbonate. Among these, acetyl peroxide, 2,2'-azobis(4-methoxy-2,4-dimethyl valeronitrile), di-n-propyl peroxydicarbonate, and dicyclohexyl peroxydicarbonate are suitable for the present invention. Further, 2,2'-azobis(4-methoxy-2,4-dimethyl valeronitrile) is most preferable.

It is possible to supply other polymerizable monomers during the polymerization process so as to permit copolymerization of the same. Examples of polymerizable monomers used for copolymerization include: α-olefins such as propylene, n-butene, i-butene, 4-methyl-1-pentene, 1-hexene, and 1-octene; unsaturated carboxylic acids such as itaconic acid, methacrylic acid, acrylic acid, and maleic acid, salts of the same, partially or completely esterified products of the same, amides of the same, and anhydrides of the same; vinylsilane-based compounds such as vinyl trimethoxysilane; unsaturated sulfonic acid and salts of the same; alkyl thiols; and vinyl pyrrolidones.

Preferred embodiment of the apparatus in accordance with the invention is described below with reference to the drawings.

In the apparatus of FIG. 1, two or more pipes for introducing raw materials 5, 6, 7 are connected to a polymerization vessel 1. The number and positions of the pipes are not limited to that shown in the drawing. Ethylene, a polymerization initiator, a polymerization solvent, and optionally a portion of a vinyl acetate containing liquid to be added as a raw material are supplied into the vessel 1 through the pipes 5, 6, 7. The polymerization solution in the vessel is taken out of the vessel after the polymerization or continuously during the polymerization. The solution is drained through a pipe for recovering a polymerized solution 9 that is connected to the lower portion of the vessel. An agitator 8 is preferably placed in the vessel for ensuring the homogeneity of the solution.

A pipe 10 for introducing a vinyl acetate containing liquid is connected to a heat exchanger 2, through which a portion or all of the vinyl acetate containing liquid is supplied into the heat exchanger 2. Pipes 11, 12 for introducing and draining a refrigerant are also connected to the heat exchanger. The positions of the pipes 11, 12 are not limited to that shown in the drawing. It is preferable that the refrigerant is introduced from the pipe 11 connected to the upper portion of the exchanger and drained through the pipe 12 connected to the lower portion. This is to ensure that the upper portion of the heat exchanger is efficiently cooled.

To let out gas from the heat exchanger 2, another pipe 13 is connected to the lower portion of the exchanger. A mist separator (not shown) can be connected to the pipe 13 for exhausting gas. Liquid-drops in the exhausted gas can be removed by the mist separator to recover or release ethylene without such mist. The mist separator is a device that can separate liquid-drops floating in gas from the gas by external forces such as the force of gravity, centrifugal force or electrostatic force or by using a screening or sieving effect. Examples of the mist separators include gravity settling devices, cyclone collectors, electrostatic precipitators, scrubbers, bag filters, and packed bed type filters. A preferred separator is a cyclone collector.

Two pipes 3, 4 connect the polymerization vessel 1 with the heat exchanger 2 and these four elements 1, 2, 3, 4 form a material-circulating system. An ethylene containing gas is introduced from the vessel into the heat exchanger through the gas-introducing pipe 3 while the vinyl acetate containing liquid including ethylene is introduced from the heat exchanger to the vessel through the condensate-introducing pipe 4.

All or a portion of the vinyl acetate containing liquid to be supplied into the vessel 1 is charged into the heat exchanger 2 through a pipe 10 that is connected to the upper portion of the heat exchanger. The vinyl acetate containing liquid is introduced into the heat exchanger 2 and absorbs the ethylene while passing through the heat exchanger. The liquid including ethylene plays an important role in reducing the heat of polymerization. Thus, preferably all of the vinyl acetate containing liquid raw material should be introduced through the heat exchanger 2 to enhance the heat reducing effect.

An ethylene containing gas is introduced into the heat exchanger 2 via the pipe 3. The ends of pipes 3, 10 opening into the heat exchanger 2 are positioned in an upper portion of the exchanger. If the pipe 3 is positioned with the opening in a lower portion of the heat exchanger, increasing the supply of the gas tends to cause flooding of the vinyl acetate containing liquid. The end of pipe 10 opening into the heat exchanger 2 should be arranged in close proximity to that of the pipe 3 so as to ensure the sufficient contact between the gas and the liquid. The ethylene containing gas passes down the heat exchanger in parallel to the liquid from the upper portion to the lower portion, while contact with the liquid. As a result, the ethylene in the gas is dissolved into the liquid.

The vinyl acetate and ethylene containing liquid is introduced into vessel 1 via pipe 4. The heat of the solution, or the heat of polymerization, decreases the ethylene solubility of the liquid and causes an excess of ethylene to be vaporized. The ethylene in excess of the ethylene solubility is vaporized. In the case of continuous manufacture, ethylene is believed to be circulate in the devices 1, 2 and pipes 3, 4. A portion of ethylene is drained through pipe 9 and added from a ethylene source that is connected to vessel 1 through at least one of pipes 5, 6, 7. A vinyl acetate source is connected to at least pipe 10.

EVA obtained by the present invention can be saponified to EVOH by a known saponification method using an alkali catalyst. EVA can be saponified in a continuous operation or a batch operation. The degree of EVOH saponification is preferably not less than 95%, more preferably not less than 99%. In the case where the degree of saponification is not sufficient, the gas barrier properties may deteriorate. To improve interlayer adhesiveness or the like, the degree of saponification may be in a range of about 80% to 95%. This EVOH can be used singly or in combination with EVOH having a saponification degree of not less than 99%.

EVOH obtainable by the above method preferably has a melt flow rate (MFR) in the range of 0.1 gram per ten minutes (g/10 min) to 100 g/10 min. Here, the MFR of EVOH is measured at 190° C. under a load of 2160 g, according to the Japanese Industrial Standard (JIS) K7210. In the case where the EVOH has a melting point in the vicinity of or above 190° C., the MFR is a value obtained by extrapolating to 190° C. using a semilogarithmic graph with the reciprocal of absolute temperature as the horizontal axis and the MRF as the vertical axis (logarithm). In this case, measurement should be carried out at a plurality of temperatures higher than the melting point under a load of 2160 g.

Various kinds of additives may be added to EVOH, according to necessity. Examples of such additives include antioxidants, plasticizers, thermal stabilizers, ultraviolet absorbers, antistatic agents, lubricants, colorants, fillers, and other thermoplastic resins. EVOH is moldable by known molding methods into various kinds of molded products such as films, sheets, pipes, tubes, and bottles.

EXAMPLES

The present invention is described in more detail by reference to the following non-limiting examples.

Example 1

EVA was continuously manufactured in the apparatus shown in FIG. 1. A polymerization vessel 1 having a capacity of 750 L and an upright wetted-wall multi-tubular heat exchanger 2 having ten tubes was prepared. The heating area (area of heat-transfer surface) of the heat exchanger was 4 m$^2$.

Ethylene, 2,2'-azobis(4-methoxy-2,4-dimethyl valeronitrile) as polymerization initiator and methanol as polymerization solvent were introduced into the vessel through pipes 5, 6, 7, respectively. The ethylene was supplied at a rate of 10.3 kg/hr. The supply rates of the polymerization initiator and the polymerization solvent were 9.8 g/hr and 1.2 kg/hr, respectively.

Vinyl acetate was introduced via pipe 10 into heat exchanger 2 and from heat exchanger 2 via pipe 4 into vessel 1 at a rate of 27.5 kg/hr. An ethylene containing gas was introduced from vessel 1 into heat exchanger 2 via pipe 3. The vinyl acetate flowed down along the surface of the tubes in parallel to the ethylene in heat exchanger 2 and absorbed the ethylene. The vinyl acetate and ethylene containing liquid was poured into vessel 1 via pipe 4 and mixed with the polymerization solution to cause continuous copolymerization of the vinyl acetate with the ethylene.

During the copolymerization, 30 wt % aqueous methanol solution as refrigerant was supplied from pipe 11 and drained through pipe 12. In heat exchanger 2, the refrigerant flowed in parallel to the vinyl acetate. The heat exchanger was able to remove all of the heat that was generated by the copolymerization. For 12 days, polymerization solution including EVA was continuously obtained through a pipe 9 at a rate of 39 kg/hr without flooding in the heat exchanger. The amount of heat removed with the heat exchanger 2 was estimated to be 6880 kcal/hr (28.8 MJ/hr).

Example 2

EVA was continuously manufactured in the same manner as that in Example 1 except that the refrigerant was supplied from the pipe 12 and drained through the pipe 11 to flow in countercurrent to the vinyl acetate in the heat exchanger 2. No flooding was observed during 12 days of continuous operation. The amount of heat removed with the heat exchanger 2 was estimated to be 5130 kcal/hr (21.5 MJ/hr).

Comparative Example

Figure 2:
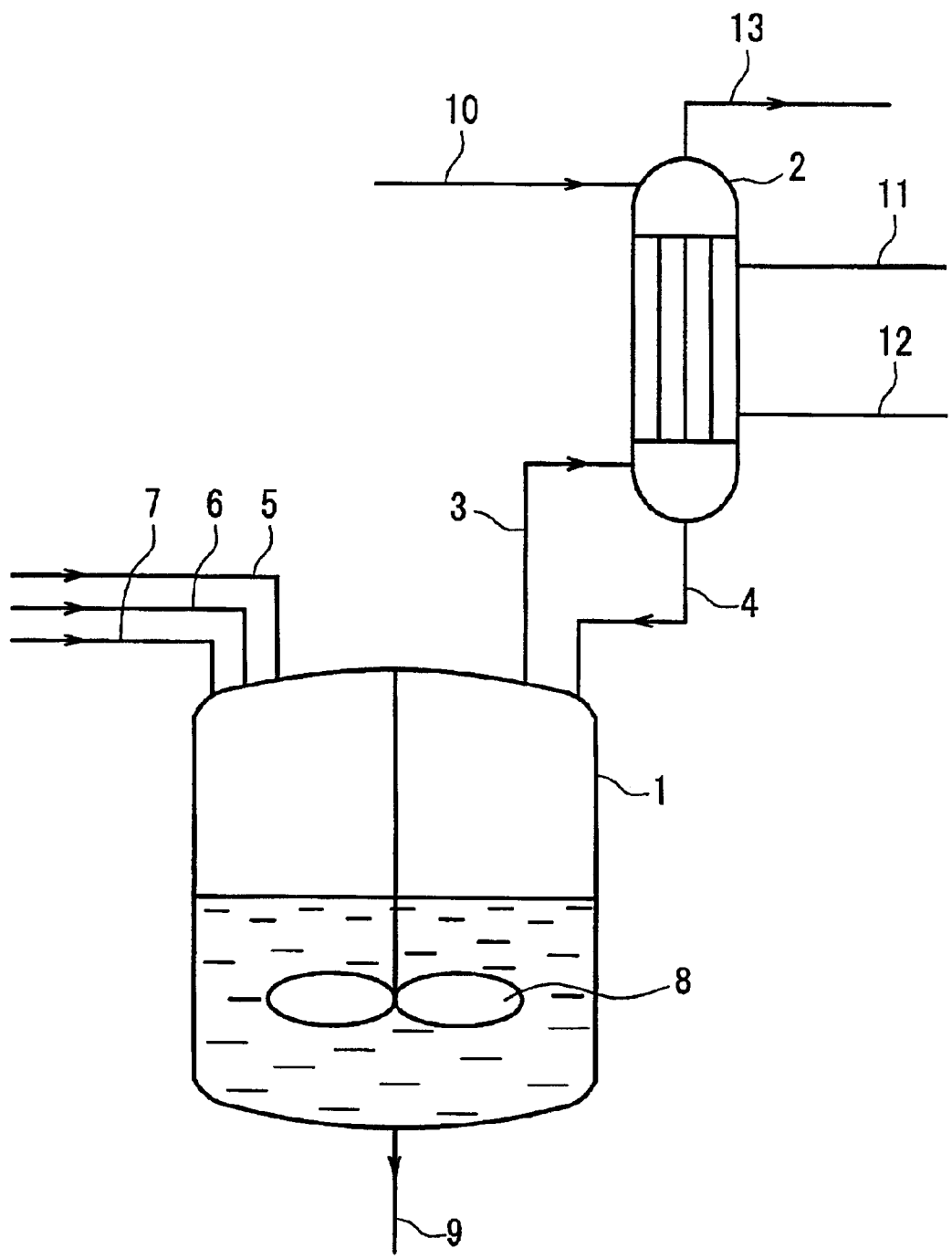
FIG. 2 shows a conventional apparatus for manufacturing EVA.

EVA was manufactured in the same manner as that in Example 2 except that the gas-introducing pipe 3 was connected to a lower portion of the heat exchanger 2 as shown in FIG. 2. In this case, the vinyl acetate flows down in countercurrent to the ethylene. Shortly after starting the operation, flooding of the vinyl acetate occurred frequently, and this forced the operation to be stopped.

Then, a coil was placed in the vessel 1. EVA was continuously manufactured while the heat generated by the copolymerization was removed with the heat exchanger, the coil and a jacket of the vessel. The amount of the heat removed with the heat exchanger 2 was estimated to be 3980 kcal/hr (16.7 MJ/hr).

The operation conditions and the results are shown in Table 1.

The present invention can increase the productivity of the apparatus for manufacturing EVA and is suitable particularly for small-scale apparatus.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

TABLE 1

| | Polymerization Conditions | | | Solution | Et. Content | Removed Heat with |
| --- | --- | --- | --- | --- | --- | --- |
| | $T_1$ (° C.) | $T_2$ (° C.) | Pressure (MPa) | Output (kg/hr) | in EVA (mol %) | Exchanger (kcal/hr) |
| Ex. 1 | 25.5 | 60 | 5.714 | 39 | 44 | 6880 |
| Ex. 2 | 25.5 | 60 | 5.714 | 39 | 44 | 5130 |
| Com. Ex. | 29.4 | 60 | 5.714 | 39 | 44 | 3980 |

$T_1$: Temperature of Vinyl Acetate to be mixed with Solution in Vessel
$T_2$: Temperature of Polymerization Solution in Vessel
Pressure: Pressure of Gas Phase in Vessel
Et.: Ethylene
EVA: Ethylene Vinyl Acetate Copolymer

What is claimed is:

1. A method for the manufacture of an ethylene-vinyl acetate copolymer in a polymerization solution comprising ethylene, vinyl acetate, a polymerization solvent and a polymerization initiator, the method comprising:
   (a) introducing an ethylene containing gas and a vinyl acetate containing liquid into a heat exchanger, said gas comprising ethylene vaporized from the polymerization solution;
   (b) bringing said gas into contact with said liquid in the heat exchanger thereby dissolving at least a portion of the ethylene in said gas into said liquid; and
   (c) introducing said liquid from the heat exchanger into the polymerization solution, wherein said gas and said liquid flow in parallel with each other in the same direction in the heat exchanger.

2. The method as claimed in claim 1, wherein the vinyl acetate containing liquid is selected from the group consisting of vinyl acetate and a vinyl acetate solution.

3. The method as claimed in claim 1, wherein the heat exchanger comprises a plurality of tubes, in which the vinyl acetate containing liquid flows along the inner surfaces of said tubes and a refrigerant flows along the outer surfaces of said tubes.

4. The method as claimed in claim 3, wherein a refrigerant and the vinyl acetate containing liquid flows in parallel with each other in the heat exchanger.

5. The method as claimed in claim 1, wherein a temperature $T_1$ (° C.) of the vinyl acetate containing liquid that is introduced from the heat exchanger into the polymerization solution and a temperature $T_2$ (° C.) of the polymerization solution satisfy the relationship $-20 \leq T_1 < T_2$.

6. The method as claimed in claim 1, wherein the ethylene-vinyl acetate copolymer contains 5 mol % to 60 mol % of ethylene.

7. The method as claimed in claim 1, wherein the polymerization solvent comprises an aliphatic alcohol having not more than four carbon atoms.

8. A method for the continuous manufacture of an ethylene-vinyl acetate copolymer containing 5 mol % to 60 mol % of ethylene, the method comprising:

(a') continuously introducing ethylene, a vinyl acetate containing liquid, a polymerization solvent and a polymerization initiator into a polymerization vessel, thereby forming a polymerization solution, wherein at least a portion of the liquid is introduced via a heat exchanger, wherein the vinyl acetate liquid is selected from the group consisting of vinyl acetate and a vinyl acetate solution;

(b') continuously introducing an ethylene containing gas comprising ethylene vaporized from the polymerization solution into the heat exchanger;

(c') continuously bringing said gas into contact with said liquid in the heat exchanger so as to dissolve at least a portion of the ethylene in said gas into said liquid;

wherein said gas and said liquid flow in parallel with each other in the same direction in the heat exchanger, (d') continuously introducing said liquid from the heat exchanger into the polymerization solution;

(e') continuously vaporizing a portion of the ethylene in the polymerization solution thereby absorbing at least a portion of the heat of polymerization in the polymerization solution, wherein said gas in step (b') includes at least a portion of the ethylene vaporized in step (e'); and (f') continuously draining a portion of the polymerization solution from the vessel.

9. A method for the manufacture of an ethylene-vinyl alcohol copolymer comprising saponifying the ethylene-vinyl acetate copolymer obtained by the method as claimed in claim 1.

* * * * *